United States Patent [19]
Smith et al.

[11] Patent Number: 6,047,131
[45] Date of Patent: Apr. 4, 2000

[54] UNDERWATER CAMERA WITH ELASTIC SHUTTER RELEASE BUTTON THAT IS DEFORMED BY WATER PRESSURE TO PROVIDE UNDERWATER DEPTH INDICATION

[75] Inventors: Stephen J. Smith, Shortsville; James D. Boyd, Rochester; Michael P. Cramer, Victor, all of N.Y.

[73] Assignee: Eastman Kodak Company, Rochester, N.Y.

[21] Appl. No.: 09/266,996

[22] Filed: Mar. 12, 1999

[51] Int. Cl.⁷ .................................................. G03B 17/08
[52] U.S. Cl. ................................................................ 396/26
[58] Field of Search .................................. 396/25, 26, 27, 396/29

[56] References Cited

U.S. PATENT DOCUMENTS

| | | |
|---|---|---|
| 3,950,773 | 4/1976 | Winkler et al. . |
| 4,999,664 | 3/1991 | Foust ........................................... 396/26 |
| 5,111,222 | 5/1992 | Hayakawa et al. . |
| 5,159,366 | 10/1992 | Gell . |
| 5,365,290 | 11/1994 | Suzuki et al. . |

*Primary Examiner*—Howard B. Blankenship
*Attorney, Agent, or Firm*—Roger A. Fields

[57] ABSTRACT

An underwater camera which comprises a shutter release button having an elastic construction that permits the shutter release button to be manually depressed to initiate shutter opening and to be increasingly depressed because of increases in the water pressure as the underwater depth of the camera is increased, and an underwater depth gauge that indicates increases in the underwater depth of the camera, is characterized in that the underwater depth gauge is coupled with the shutter release button for the underwater depth gauge to indicate increases in the underwater depth of the camera in accordance with increases in the depression of the shutter release button.

5 Claims, 9 Drawing Sheets

_6,047,131_

UNDERWATER CAMERA WITH ELASTIC SHUTTER RELEASE BUTTON THAT IS DEFORMED BY WATER PRESSURE TO PROVIDE UNDERWATER DEPTH INDICATION

FIELD OF THE INVENTION

The invention relates generally to the field of photography, and in particular to underwater cameras. More specifically, the invention relates to an underwater camera with an elastic shutter release button that is deformed by the water pressure to provide a visible indication of the underwater depth of the camera.

BACKGROUND OF THE INVENTION

It is generally known for an underwater camera to include a shutter release button having an elastic construction that permits the shutter release button to be manually depressed to initiate shutter opening. The elasticity of the shutter release button makes it relatively easy to handle or grasp the shutter release button underwater in order to manually depress it. The problem is that the shutter release button is increasingly depressed due to increases in the water pressure as the underwater depth of the camera is increased. Thus, when the camera is submerged to an underwater depth that is greater than the maximum depth at which the shutter release button can withstand the water pressure before caving in to initiate shutter opening, a wasted exposure will be made.

The underwater camera often has an underwater depth gauge that indicates increases in the underwater depth of the camera, but the depth gauge typically operates independently of the shutter release button.

SUMMARY OF THE INVENTION

An underwater camera which comprises a shutter release button having an elastic construction that permits the shutter release button to be manually depressed to initiate shutter opening and to be increasingly depressed because of increases in the water pressure as the underwater depth of the camera is increased, and an underwater depth gauge that indicates increases in the underwater depth of the camera, is characterized in that:

the underwater depth gauge is coupled with the shutter release button for the underwater depth gauge to indicate increases in the underwater depth of the camera in accordance with increases in the depression of the shutter release button.

DETAILED DESCRIPTION OF THE INVENTION

Figure 1:
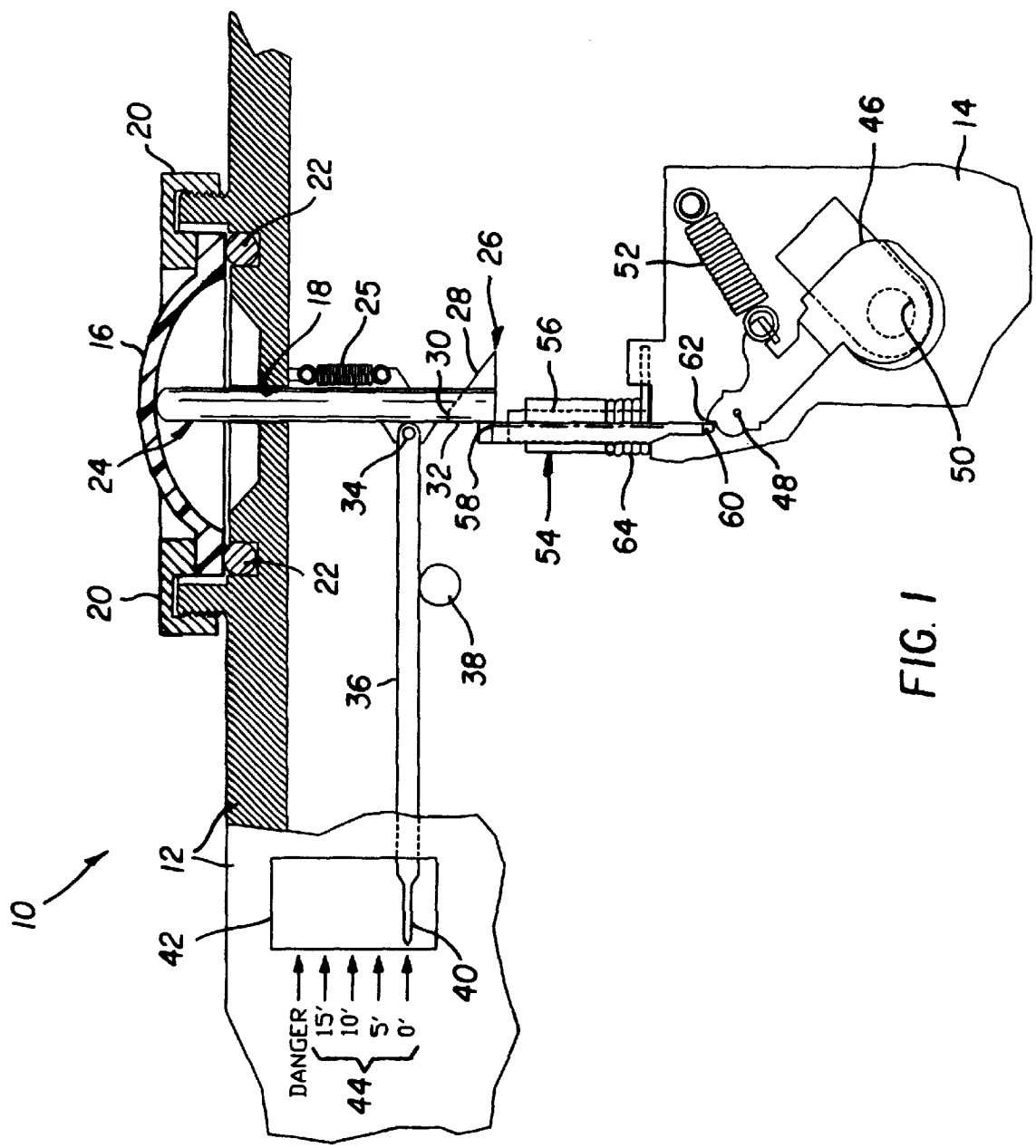
FIG. 1 is an elevation view of a shutter release button and an underwater depth gauge in an underwater camera, according to a preferred embodiment of the invention.
Figure 2:
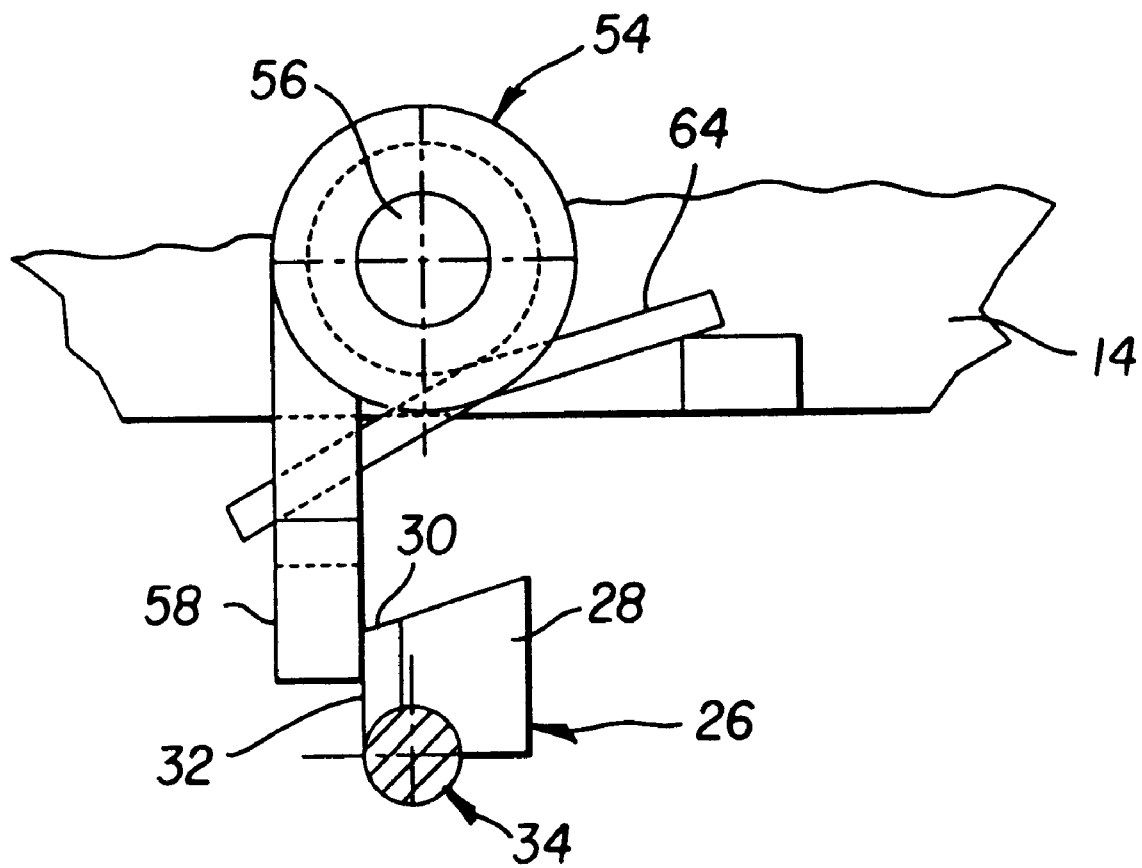
FIG. 2 is a top plan view of an actuator for a shutter blade that is released to cause shutter opening when the shutter release button is sufficiently depressed.
Figure 3:
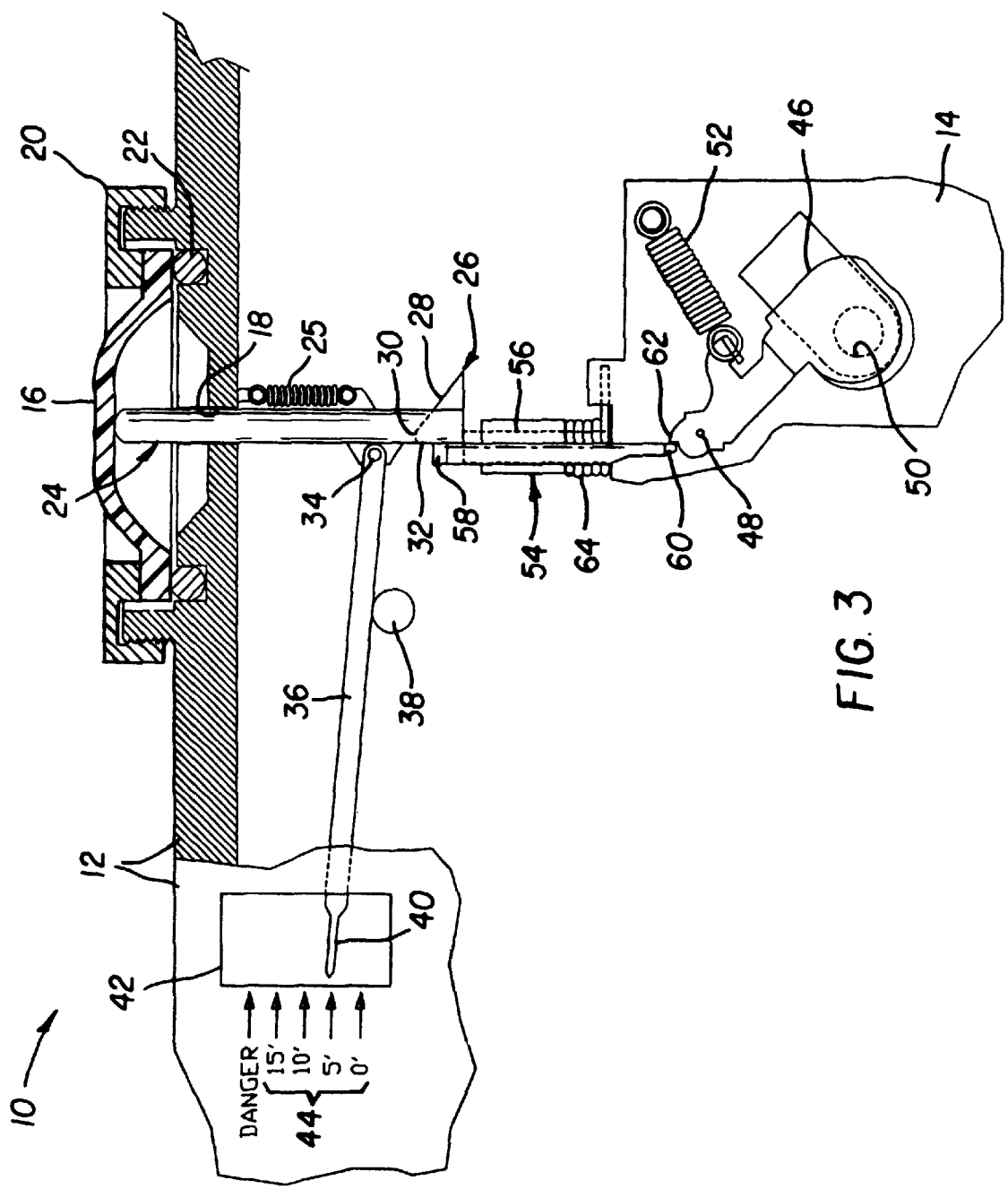
FIGS. 3–8 are elevation views similar to FIG. 1, showing the shutter release button being increasingly depressed by the water pressure as the camera is submerged to various underwater depths.
Figure 4:
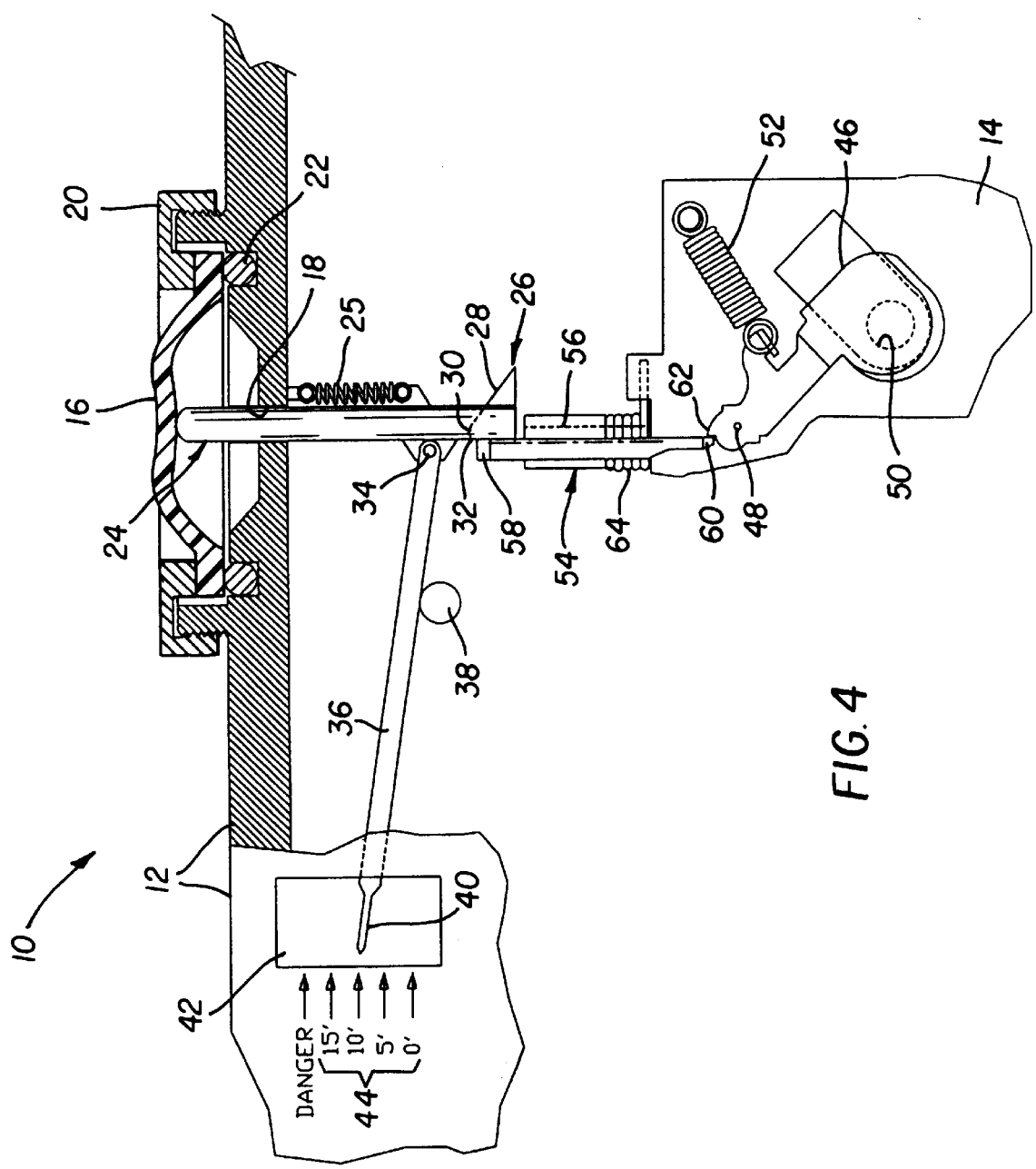
Figure 5:
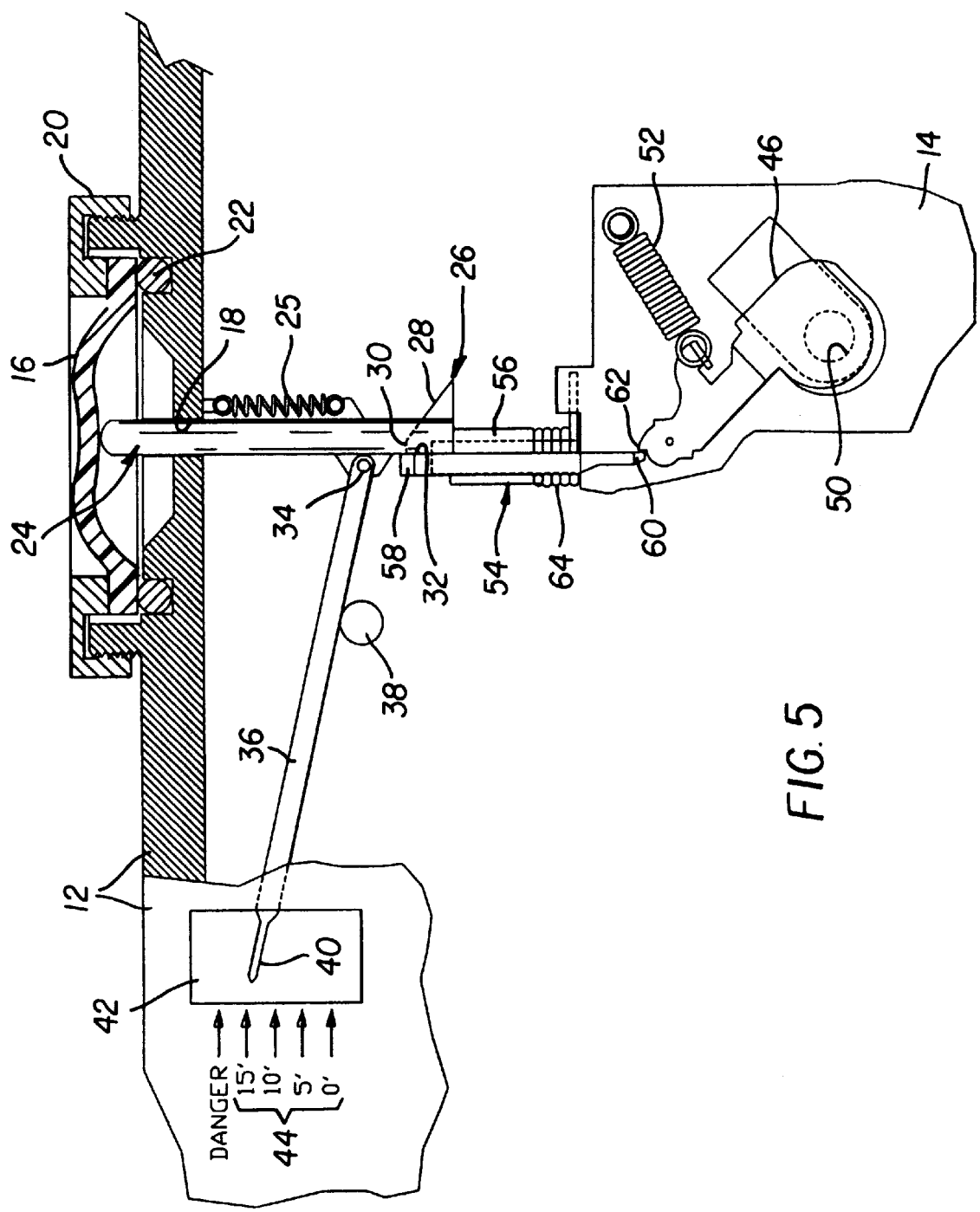
Figure 6:
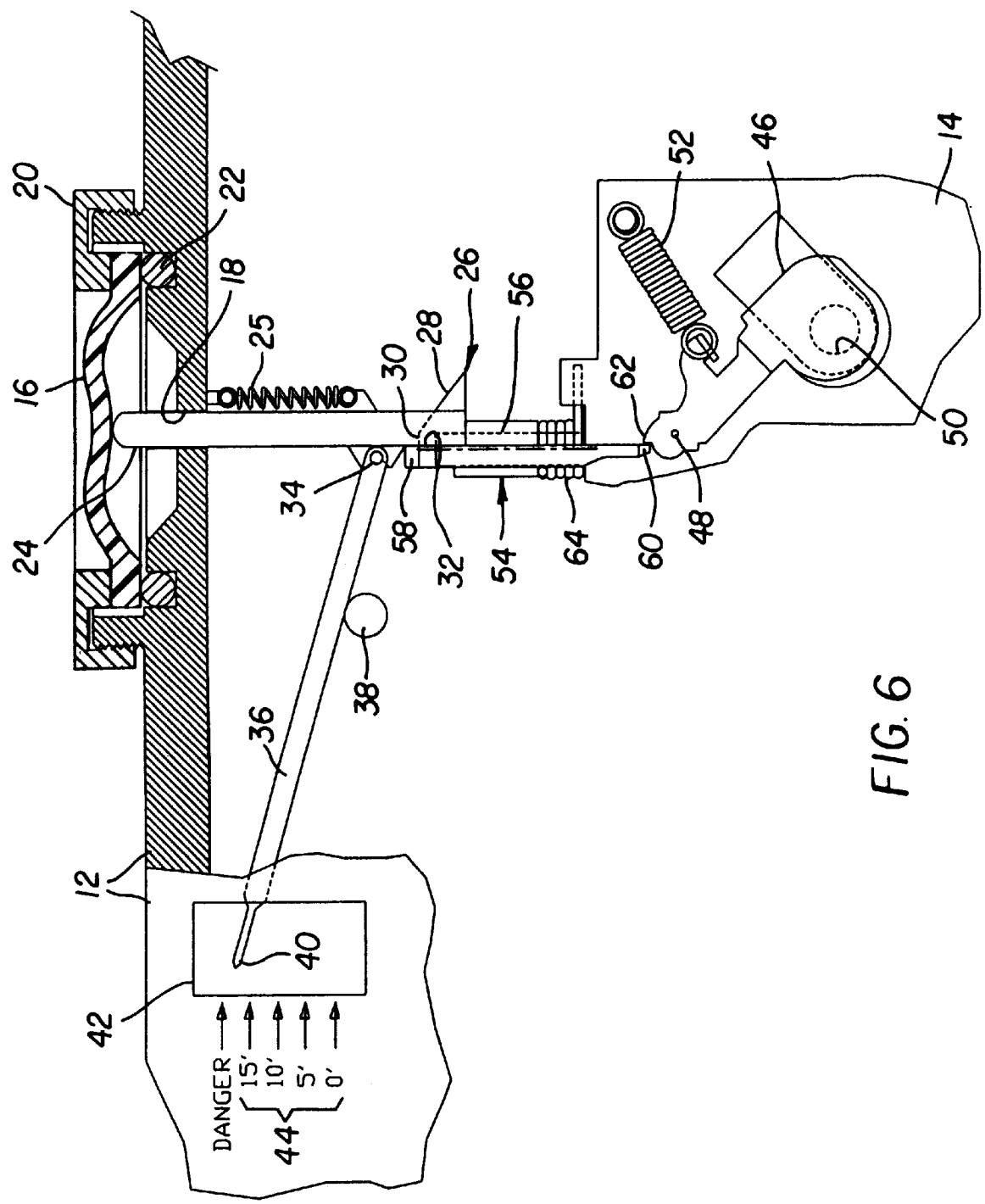

The invention is disclosed as being embodied preferably in an underwater camera. Because the features of an underwater camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–9 show a portion of an underwater camera 10 having a front and top cover part 12 that is located in front and on top of a main body part 14. A dome-shaped shutter release button 16 is held in place over a top opening 18 in the front and top cover part 12 by a retaining ring 20 that is thread-connected to the front and top cover part. A resilient rubber o-ring 22 provides a water-tight seal between the shutter release button 16 and the front and top cover part 12. A plunger rod 24 is positioned beneath the shutter release button 16 and longitudinally extends through the top opening 18. A helical tension return spring 25 interconnects the front and top cover part 12 and the plunger rod 24 to continuously urge the plunger rod upwards through the top opening 18 in FIG. 1 and against the inside of the shutter release button 16. The plunger rod 24 includes an integral end projection 26 that has an incline or ramp 28, a top flat or plateau 30, and a vertical retainer wall 32. See FIGS. 1 and 2. The plunger rod 24 is pivotally connected at a pivot pin 34 to a pivotal pointer 36. The pointer 36 is supported on a fixed fulcrum 38 and has a pointing end 40 that is positioned behind a front window 42 in the front and top cover part 12 to point to any one of several underwater depth indicia 44 which are "0'" (0 feet), "5'" (5 feet), "10'" (10 feet), "15'" (15 feet), and "DANGER" (a predetermined maximum depth), next to the front window. The underwater depth indicia 44 and the pointer 36 thus are an underwater depth gauge that operates to visually indicate increases in the underwater depth of the camera 10. A shutter blade 46 is pivotally connected at a pivot pin 48 to the main body part 14 for pivotal opening movement clockwise in FIG. 7 about the pivot pin, i.e. shutter opening, to uncover an aperture 50 in the main body part in order to expose a filmstrip (not shown) in the camera 10, and for pivotal closing movement counterclockwise in FIG. 8 about the pivot pin, i.e. shutter closing, to re-cover the aperture. A helical tension return or closing spring 52 continuously urges the shutter blade 46 to re-cover the aperture 48. A cylinder-shaped actuator 54 is rotatable about a fixed support shaft 56 and has a top end flange 58 positioned against the vertical retainer wall 32 on the end projection 26 of the plunger 24 and a bottom end flange 60 positioned against a protuberance 62 on the shutter blade 46 in FIGS. 1 and 2. A helical torsion spring 64 continuously urges the actuator 54 to rotate counter-clockwise in FIGS. 1 and 2 about the shaft 56, but the actuator is prevented from being rotated counter-clockwise because its top end flange 58 is blocked by the vertical retainer wall 32 on the end projection 26 of the plunger rod 24.

Figure 7:
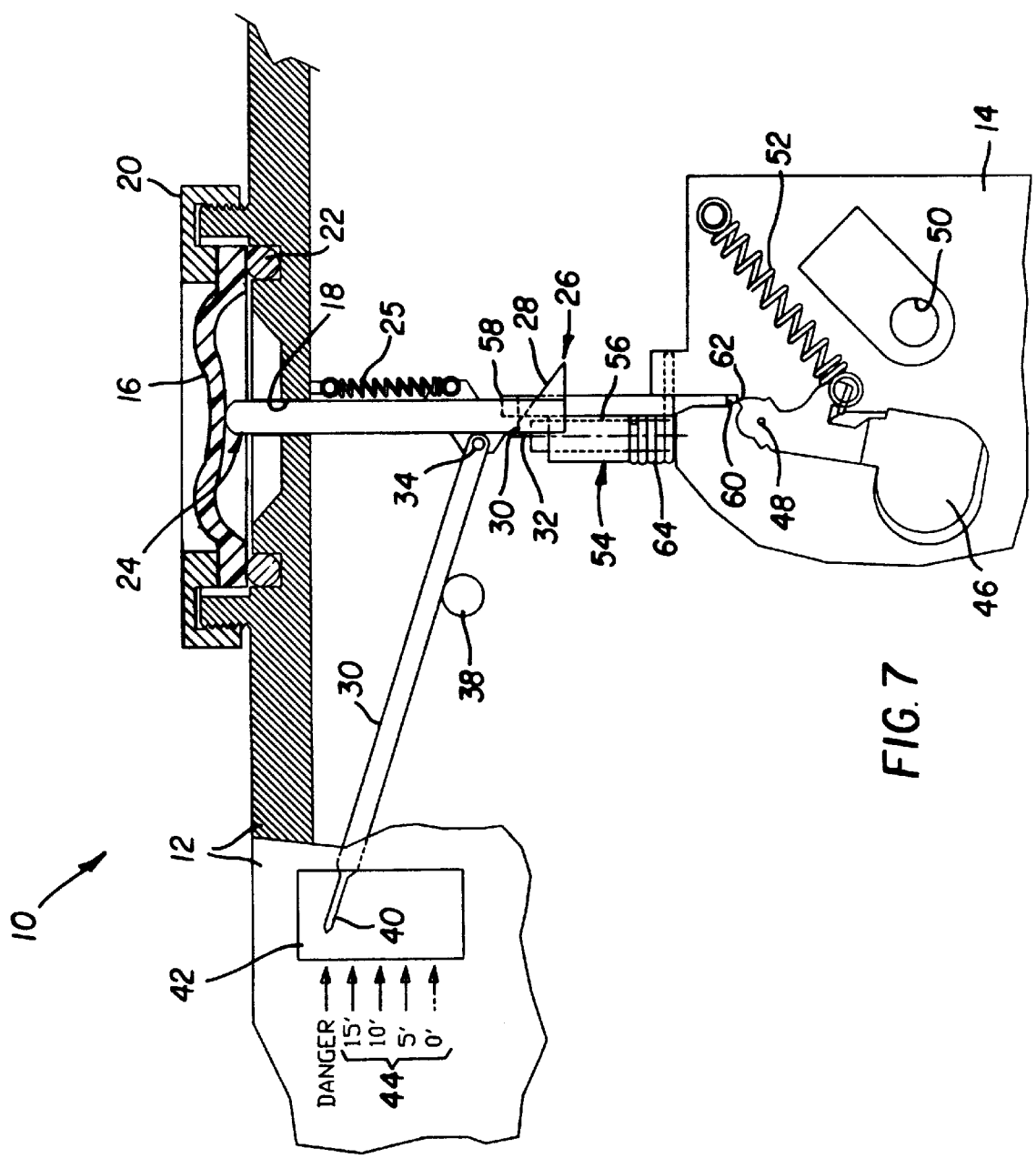
Figure 9:
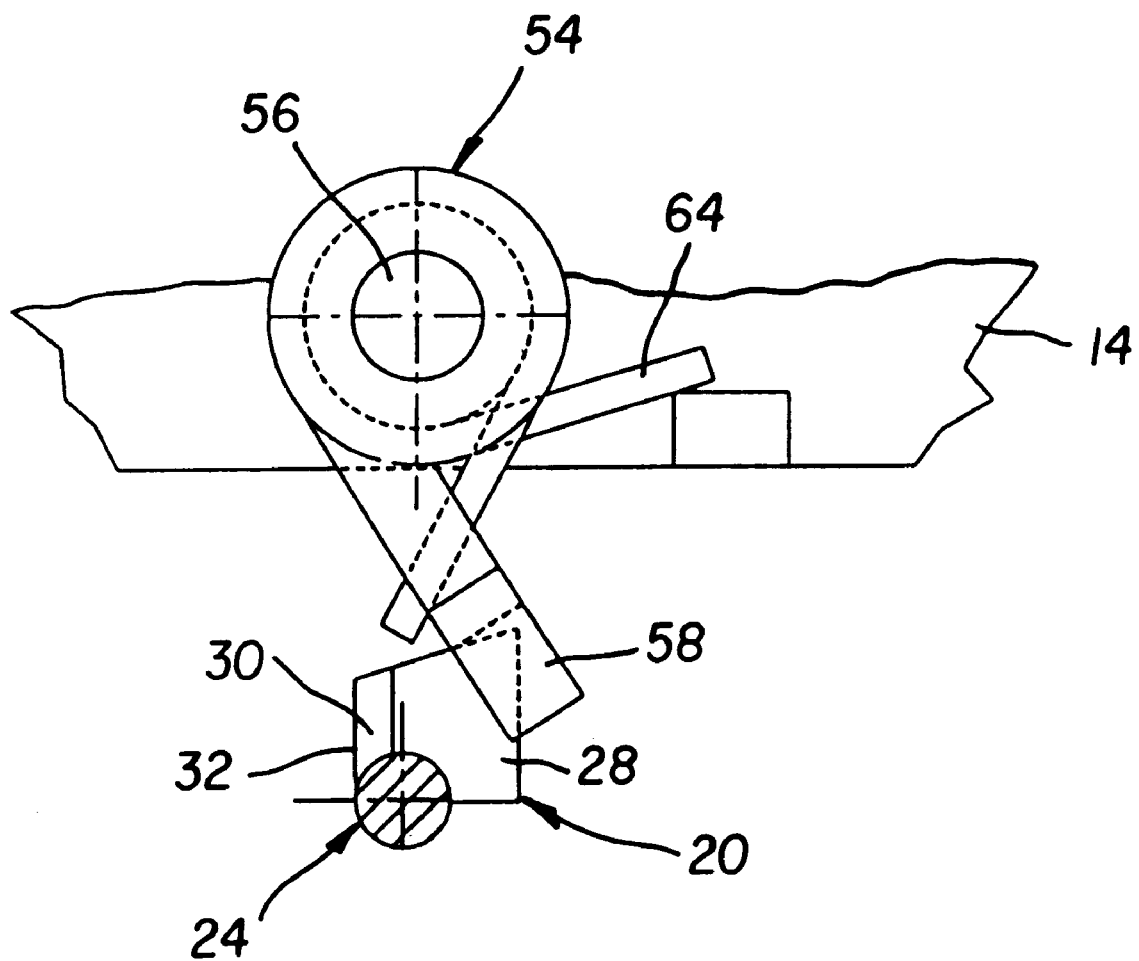
FIG. 9 is a top plan view similar to FIG. 2 and corresponding to FIGS. 7 and 8.

The shutter release button 16 has an elastic construction that permits it to be manually depressed to initiate shutter opening. When the shutter release button 16 is manually depressed to the extent shown in FIG. 7, the plunger rod 24 is similarly lowered and the vertical retainer wall 32 on the end projection 26 of the plunger rod is lowered beyond the top end flange 58 on the actuator 54. Since the top end flange 58 on the actuator 54 is no longer positioned against the vertical retainer wall 32 on the end projection 26 of the plunger rod 24, the torsion spring 64 rotates the actuator 54 counter-clockwise in FIGS. 1 and 2 about the shaft 56. The top end flange 58 on the actuator 54 is thus moved over the top flat 30 on the end projection 26 of the plunger rod 24 and the bottom end flange 60 on the actuator, which is positioned against the protuberance 62 on the shutter blade 46, pivots the shutter blade clockwise in FIG. 7 about the pivot pin 48 to uncover the aperture 50 in order to expose the filmstrip (not shown) in the camera 10. Then, the top end flange 58 on the actuator 54 is moved beyond the top flat 30 on the end projection 26 of the plunger rod 24 to above the incline 28 on the end projection of the plunger rod as shown in FIGS. 7 and 9, and the bottom end flange 60 on the actuator separates from the protuberance 62 on the shutter blade 46. This allows the closing spring 52 to pivot the shutter blade 46 counterclockwise in FIG. 7 about the pivot pin 48 to re-cover the aperture 50., and it allows the return spring 25 to raise the plunger rod 24 upward to position the incline 28 on the end projection 26 of the plunger rod against the top end flange 58 on the actuator 54. To get back to FIGS. 1 and 2, a known re-cocking device (not shown) rotates the actuator 54 clockwise in FIGS. 7 and 9 about the shaft 56 to re-position the top end flange 58 on the actuator against the vertical retainer wall 32 on the end projection 26 of the plunger rod 24 and to re-position the bottom end flange 60 on the actuator against the protuberance 62 on the shutter blade 46.

The elasticity of the shutter release button 16 causes it to be increasingly depressed because of increases in the water pressure as the underwater depth of the camera 10 is increased. Since the plunger rod is 24 is increasingly lowered because the shutter release button 16 is increasingly depressed, the pointer 36 is increasingly pivoted clockwise in FIGS. 3–7 about the pivot pin 34 to move the pointing end 40 of the pointer to point to the various underwater depth indicia 44—"5'" (5 feet), "10'" (10 feet), "15'" (15 feet), and "DANGER" (the predetermined maximum depth),. The indicia "DANGER" (the predetermined maximum depth) serves as warning that a further increase in the underwater depth of the camera 10 will result in automatic shutter opening, i.e. without the shutter release button 16 having been manually depressed. If the underwater depth of the camera 10 is greater than the predetermined maximum depth, the shutter release button 16 will be sufficiently depressed by the water pressure to initiate shutter opening similar to when the shutter release button is manually depressed to initiate shutter opening.

Figure 8:
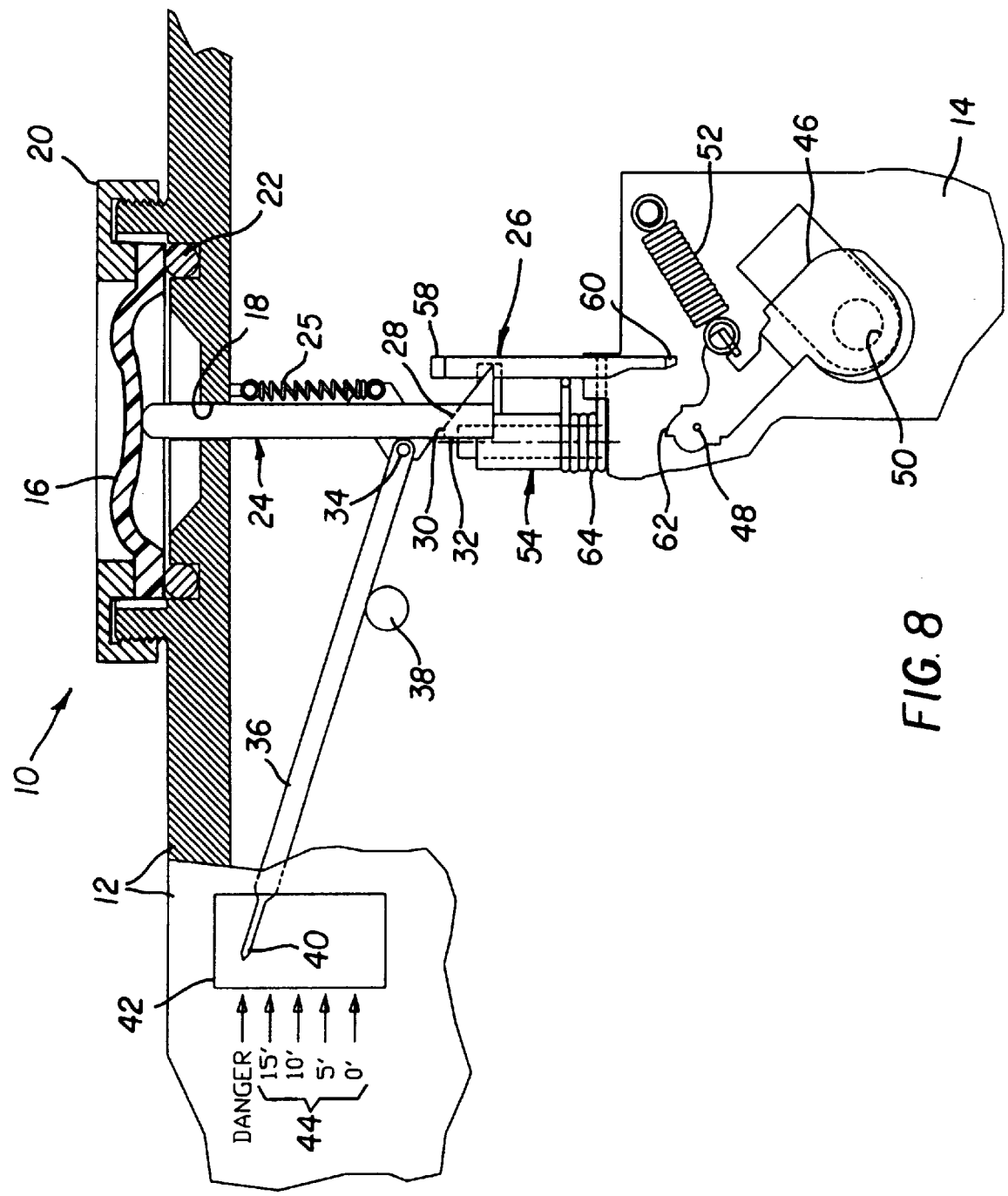

In FIG. 8, the underwater depth of the camera 10 is greater than the predetermined maximum depth and the closing spring 52 has pivoted the shutter blade 46 counter-clockwise about the pivot pin 48 to re-cover the aperture 50. However, in this instance, the return spring 25 cannot raise the plunger rod 24 upward to position the incline 28 on the end projection 26 of the plunger rod against the top end flange 58 on the actuator 54 because of the water pressure at this time.

The invention has been described with reference to a preferred embodiment. However, it will be appreciated that variations and modifications can be effected by a person of ordinary skill in the art without departing from the scope of the invention.

What is claimed is:

1. An underwater camera which comprises a shutter release button having an elastic construction that permits said shutter release button to be manually depressed to initiate shutter opening and to be increasingly depressed because of increases in the water pressure as the underwater depth of said camera is increased, and an underwater depth gauge that indicates increases in the underwater depth of said camera, is characterized in that:

said underwater depth gauge is coupled with said shutter release button for said underwater depth gauge to indicate increases in the underwater depth of said camera in accordance with increases in the depression of said shutter release button.

2. An underwater camera as recited in claim 1, wherein said shutter release button is adapted to be depressed sufficiently to initiate shutter opening when the underwater depth of said camera is greater than a maximum depth, and said underwater depth gauge provides an indication that said camera is at the maximum depth to provide a warning that a further increase in the underwater depth of the camera will result in shutter opening.

3. An underwater camera as recited in claim 1, wherein a plunger is positioned beneath said shutter release button for said shutter release button to increasingly depress said plunger as said shutter release button is increasingly depressed, and said underwater depth gauge includes a pointer pivotally connected to said plunger to be increasingly pivoted in accordance with increases in the depression of said plunger.

4. An underwater camera as recited in claim 3, wherein said underwater depth gauge indicates a maximum depth to warn that a further increase in the underwater depth of said camera will result in shutter opening, an actuator is movable to effect shutter opening, and a retainer on said plunger releases said actuator to permit movement of said actuator to effect shutter opening when the underwater depth of said camera exceeds the maximum depth.

5. An underwater camera as recited in claim 4, wherein a spring continuously urges said actuator to effect shutter opening.

* * * * *